United States Patent
Yamashita et al.

(10) Patent No.: US 10,494,018 B2
(45) Date of Patent: Dec. 3, 2019

(54) STEERING DEVICE

(71) Applicant: JTEKT CORPORATION, Osaka-shi, Osaka (JP)

(72) Inventors: Yoshihiro Yamashita, Okazaki (JP); Hidenori Itamoto, Tajimi (JP)

(73) Assignee: JTEKT CORPORATION, Osaka (JP)

( * ) Notice: Subject to any disclaimer, the term of this patent is extended or adjusted under 35 U.S.C. 154(b) by 149 days.

(21) Appl. No.: 15/697,049

(22) Filed: Sep. 6, 2017

(65) Prior Publication Data
US 2018/0079447 A1    Mar. 22, 2018

(30) Foreign Application Priority Data

Sep. 16, 2016  (JP) ................................. 2016-181541
Dec. 13, 2016  (JP) ................................. 2016-241541

(51) Int. Cl.
| | | |
|---|---|---|
| *B62D 5/04* | (2006.01) | |
| *B62D 6/00* | (2006.01) | |
| *B62D 15/02* | (2006.01) | |

(52) U.S. Cl.
CPC .......... *B62D 5/0469* (2013.01); *B62D 5/0409* (2013.01); *B62D 6/002* (2013.01); *B62D 6/008* (2013.01); *B62D 15/021* (2013.01)

(58) Field of Classification Search
None
See application file for complete search history.

(56) References Cited

U.S. PATENT DOCUMENTS

| | | | | |
|---|---|---|---|---|
| 2005/0060074 A1* | 3/2005 | Sakai | ..................... | B62D 6/002 |
| | | | | 701/41 |
| 2016/0096545 A1* | 4/2016 | Nakakuki | ............ | B62D 5/0469 |
| | | | | 701/41 |

FOREIGN PATENT DOCUMENTS

| | | |
|---|---|---|
| EP | 2 708 445 A2 | 3/2014 |
| JP | 2015-020506 A | 2/2015 |

OTHER PUBLICATIONS

Mar. 29, 2018 Extended Search Report issued in European Patent Application No. 17190713.2.

* cited by examiner

*Primary Examiner* — Lail A Kleinman
(74) *Attorney, Agent, or Firm* — Oliff PLC

(57) ABSTRACT

A base current command value is calculated based on a steering torque and a vehicle speed. A desired steering angle value is a constant representing the virtual steering limit position. When a steering angle threshold is set to a value close to, and smaller than, the desired steering angle value, a first correction value is calculated so that a steering reaction force is increased rapidly when a steering angle becomes equal to or larger than the steering angle threshold. A second correction value is calculated so that the steering angle becomes equal to the desired steering angle value when the steering angle becomes equal to or larger than the steering angle threshold. The base current command value is corrected by the first correction value and the second correction value. The driver is thus restrained from turning the steering wheel to a position beyond the desired steering angle value.

7 Claims, 10 Drawing Sheets

STEERING DEVICE

INCORPORATION BY REFERENCE

The disclosure of Japanese Patent Application No. 2016-181541 filed on Sep. 16, 2016 and No. 2016-241541 filed on Dec. 13, 2016 including the specification, drawings and abstract, is incorporated herein by reference in its entirety.

BACKGROUND OF THE INVENTION

1. Field of the Invention

The present invention relates to steering devices.

2. Description of the Related Art

A steering system in which a virtual rack end is set is conventionally proposed, as described in Japanese Patent Application Publication No. 2015-20506 (JP 2015-20506 A). This steering system includes a motor that applies torque to a steering mechanism of a vehicle and a control device that controls driving of the motor. The control device calculates a base current command value based on the steering torque that is detected by a torque sensor and the vehicle speed that is detected by a vehicle speed sensor. The control device also calculates a correction value based on the steering angle that is detected by a steering angle sensor. The correction value is a correction component that corrects the base current command value so that a steering reaction force is applied to a steering shaft. When the steering angle becomes equal to or larger than a steering angle threshold, the control device sharply increases the correction value so that the steering reaction force increases sharply.

With this configuration, it is difficult for the driver to operate a steering wheel to a steering angle equal to or larger than the steering angle threshold. Accordingly, a virtual steering limit position can be set near the steering angle threshold.

In the steering system having the above configuration, however, the base current command value is corrected with the correction value determined according to the steering angle. Accordingly, the steering wheel may be operated to a position beyond the virtual steering limit position if, e.g., the steering torque that is applied from the driver to the steering wheel becomes too large.

SUMMARY OF THE INVENTION

It is one object of the present invention to provide a steering device that can restrain the driver from turning a steering wheel to a position beyond a virtual steering limit position.

According to one aspect of the invention, a steering device includes: a motor that generates torque to be applied to a steering mechanism of a vehicle; and a control device that controls driving of the motor based on a command value calculated according to a state quantity representing an operation state of a steering wheel. The control device includes a base command value calculation circuit that calculates a base command value, which is a basic control component of the command value, based on the state quantity, a first correction value calculation circuit that calculates a first correction value when a steering angle value of the steering wheel reaches a threshold close to a desired steering angle value determined as a virtual steering limit position, the first correction value being a control component that controls a steering reaction force generated by the motor so that the steering reaction force is increased, a second correction value calculation circuit that calculates a second correction value when the steering reaction force is increased, the second correction value being a control component that controls the steering angle value so that the steering angle value becomes equal to the desired steering angle value, and an addition circuit that calculates the command value by adding the base command value, the first correction value, and the second correction value.

In the case where the steering wheel has been operated to a position close to the virtual steering limit position by the driver, the first correction value calculation circuit calculates the first correction value so that a force that resists the driver's operation of the steering wheel is increased, and the base command value is corrected with the first correction value. This makes it difficult for the driver to further operate the steering wheel to a position beyond the virtual steering limit position when the position of the steering wheel becomes close to the steering limit position. The driver's operation of the steering wheel can thus be virtually stopped near the steering limit position. However, if steering torque that is applied from the driver to the steering wheel becomes too large, the steering wheel may be operated to a position beyond the steering limit position.

In this respect, with the above configuration, the desired steering angle value determined as the virtual steering limit position is set, and the second correction value calculation circuit calculates the second correction value, which is a correction value that controls the steering angle value of the steering wheel so that the steering angle value becomes equal to the desired steering angle value. The base command value is corrected with the second correction value. Accordingly, even if the steering wheel is operated to a position beyond the steering limit position, the base command value is corrected with the second correction value calculated by the second correction value calculation circuit, whereby the driver can be restrained from turning the steering wheel to a position beyond the virtual steering limit position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A column assist electric power steering system (hereinafter simply referred to as the "EPS") will be described below as an embodiment of a steering device of the present invention.

Figure 1:
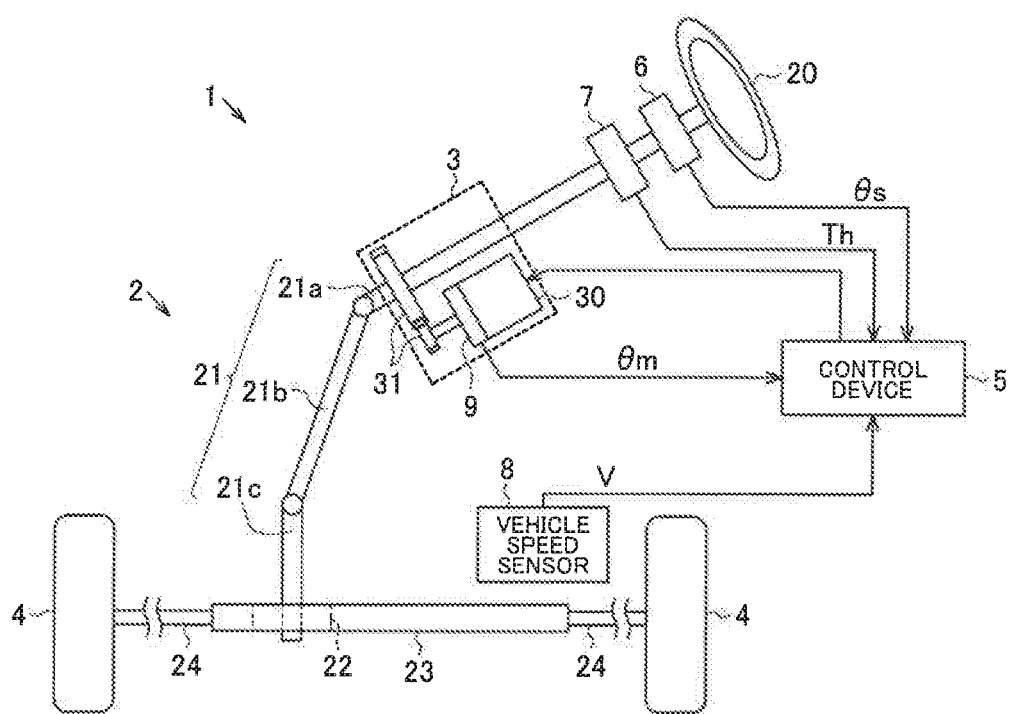
FIG. 1 is a schematic view of a steering device according to an embodiment.

As shown in FIG. 1, an EPS 1 includes a steering mechanism 2, an assist torque applying mechanism 3, a control device 5, and various sensors. The steering mechanism 2 steers steered wheels 4 based on user's operation of a steering wheel 20. The steering mechanism 2 includes a steering shaft 21 that rotates with the steering wheel 20. The steering shaft 21 has a column shaft 21a, an intermediate shaft 21b, and a pinion shaft 21c. The column shaft 21a is coupled to the steering wheel 20. The intermediate shaft 21b is coupled to the lower end of the column shaft 21a. The pinion shaft 21c is coupled to the lower end of the intermediate shaft 21b. The lower end of the pinion shaft 21c is coupled to a rack shaft 23 via a rack and pinion mechanism 22. The rack and pinion mechanism 22 is formed by a part of the pinion shaft 21c which has pinion teeth and a part of the rack shaft 23 which has rack teeth. The rotary motion of the steering shaft 21 is therefore converted to an axial (lateral in FIG. 1) reciprocating linear motion of the rack shaft 23 via the rack and pinion mechanism 22. This reciprocating linear motion is transmitted to the right and left steered wheels 4 via tie rods 24 coupled to both ends of the rack shaft 23, whereby the steered angle of the steered wheels 4 is changed.

The assist torque applying mechanism 3 has a speed reduction mechanism 31 connected to the column shaft 21a, and a motor 30 having a rotary shaft. The rotational force of the rotary shaft of the motor 30 is transmitted to the column shaft 21a via the speed reduction mechanism 31. The motor 30 is used as a source of assist torque that assists in operating the steering wheel 20. For example, the motor 30 is a three-phase brushless motor.

The various sensors are mounted in order to detect the amount by which the steering wheel 20 has been operated and state quantities of a vehicle. For example, the various sensors include a steering angle sensor 6, a torque sensor 7, a vehicle speed sensor 8, and a rotation angle sensor 9.

The steering angle sensor 6 is mounted on the column shaft 21a so as to be located between the steering wheel 20 and the assist torque applying mechanism 3. The steering angle sensor 6 periodically detects the rotation angle of the column shaft 21a that rotated by user's operation of the steering wheel 20 (the steering angle θs as a steering angle value). The torque sensor 7 is mounted on the column shaft 21a so as to be located between the steering angle sensor 6 and the assist torque applying mechanism 3. The torque sensor 7 periodically detects steering torque Th, which is a state quantity, applied to the steering shaft 21 by user's operation of the steering wheel 20. In the present embodiment, the steering angle θs is positive when the steering wheel 20 is turned to the right, namely is operated in a right steering direction, with respect to its neutral position, and is negative when the steering wheel 20 is turned to the left, namely is operated in a left steering direction, with respect to its neutral position. The steering torque Th is positive when the steering wheel 20 is operated in the right steering direction, and is negative when the steering wheel 20 is operated in the left steering direction. The vehicle speed sensor 8 detects the vehicle speed V of the vehicle. The rotation angle sensor 9 is mounted on the motor 30 and detects the rotation angle θm of the rotary shaft of the motor 30.

Figure 2:
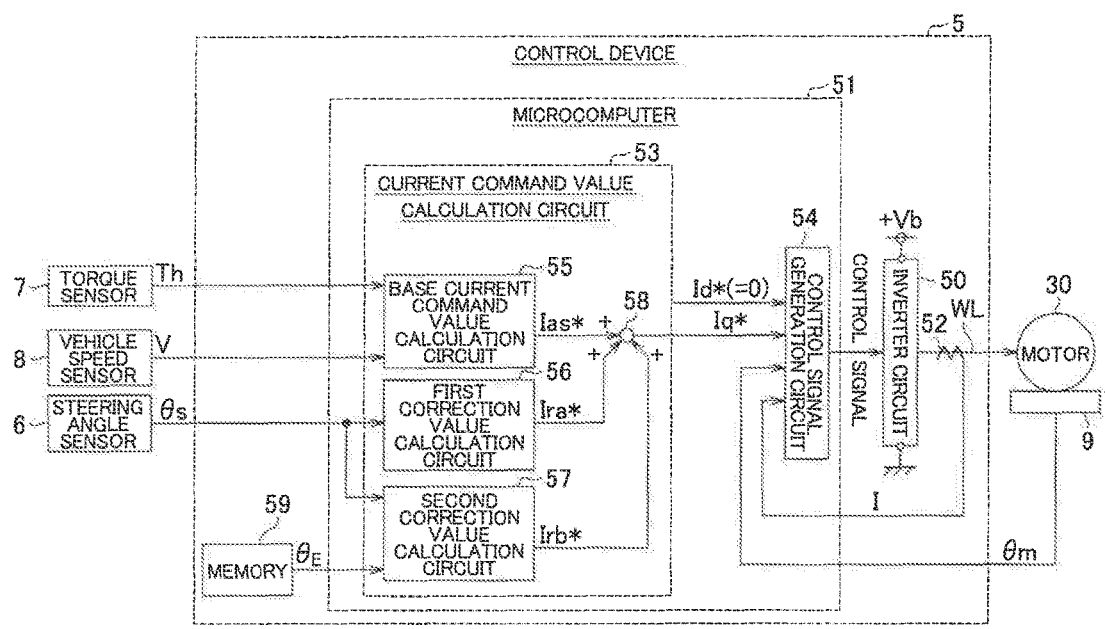
FIG. 2 is a functional block diagram of a control device for a steering device of a first embodiment.

The control device 5 receives outputs from the various sensors and controls driving of the motor 30 based on the outputs. As shown in FIG. 2, the control device 5 includes an inverter circuit 50, a microcomputer 51, and a memory 59. The inverter circuit 50 converts direct current (DC) power supplied from a power supply (power supply voltage +Vb) such as an on-board battery to three-phase (U-phase, V-phase, and W-phase) alternating current (AC) power. The microcomputer 51 outputs to the inverter circuit 50 a control signal for driving the inverter circuit 50 by pulse width modulation (PWM).

The inverter circuit 50 converts DC power supplied from the power supply to three-phase AC power based on the control signal (PWM drive signal) from the microcomputer 51. This three-phase AC power is supplied to the motor 30 through feed wires WL. A current sensor 52 is mounted on each feed wire WL. Each current sensor 52 detects a current value I of a corresponding phase of the motor 30. The output of each current sensor 52 is sent to the microcomputer 51. In FIG. 2, the feed wires WL of the three phases and the current sensors 52 of the three phases are collectively shown by a single feed wire WL and a single current sensor 52 for convenience.

The memory 59 has stored therein a program that is to be executed by the microcomputer 51 to drive the motor 30. The memory 59 has also stored therein a desired steering angle value $\theta_E$. The desired steering angle value $\theta_E$ is a desired steering angle value representing the position at which operation of the steering wheel 20 is stopped. The desired steering angle value $\theta_E$ is set to a value close to, and smaller than, the upper limit of the steering angle θs which corresponds to the maximum extent to which the steering wheel 20 and the steered wheels 4 can be mechanically operated. That is, the desired steering angle value $\theta_E$ is a desired value of the steering angle θs at a virtual steering limit position. The desired steering angle value $\theta_E$ is a constant and is determined at the time of design of vehicles in consideration of the amount by which the steering wheel 20 is operated, etc. The virtual steering limit position is set to a position before a mechanical steering limit position of the steering wheel 20 and the steered wheels 4. The output of the motor 30 is reduced when the position of the steering wheel 20 becomes close to the virtual steering limit position. This gives the driver a heavy steering feel through the steering wheel 20 and thus makes the driver recognize that the steering wheel 20 has been operated to a position close to the virtual steering limit position.

The microcomputer 51 controls driving of the motor 30 by executing the program stored in the memory 59. The microcomputer 51 generates a control signal for driving the motor 30, based on the steering angle θs, the steering torque Th, the vehicle speed V, the rotation angle θm, and the current value I of each phase detected by the various sensors and the desired steering angle value $\theta_E$. The microcomputer 51 outputs the generated control signal to the inverter circuit 50 to drive the inverter circuit 50 by PWM.

The microcomputer 51 will be described in detail. As shown in FIG. 2, the microcomputer 51 includes a current command value calculation circuit 53 and a control signal generation circuit 54. The current command value calculation circuit 53 calculates a current command value based on the steering torque Th, the vehicle speed V, the steering angle θs, and the desired steering angle value $θ_E$. The current command value is a desired value of a current to be supplied to the motor 30 and represents a d-axis current command value and a q-axis current command value on a d-q coordinate system. The q-axis current command value Iq* is a desired value of assist torque to be generated by the motor 30. The d-axis current command value Id* is fixed to zero.

The current command value calculation circuit 53 has a base current command value calculation circuit 55 that serves as a base command value calculation circuit, a first correction value calculation circuit 56, a second correction value calculation circuit 57, and an addition circuit 58. The base current command value calculation circuit 55 calculates a base current command value Ias*, which is a basic component of the q-axis current command value Iq*, based on the steering torque Th and the vehicle speed V. The base current command value Ias* is a base command value corresponding to assist torque that assists the driver in operating the steering wheel 20.

Figure 3:
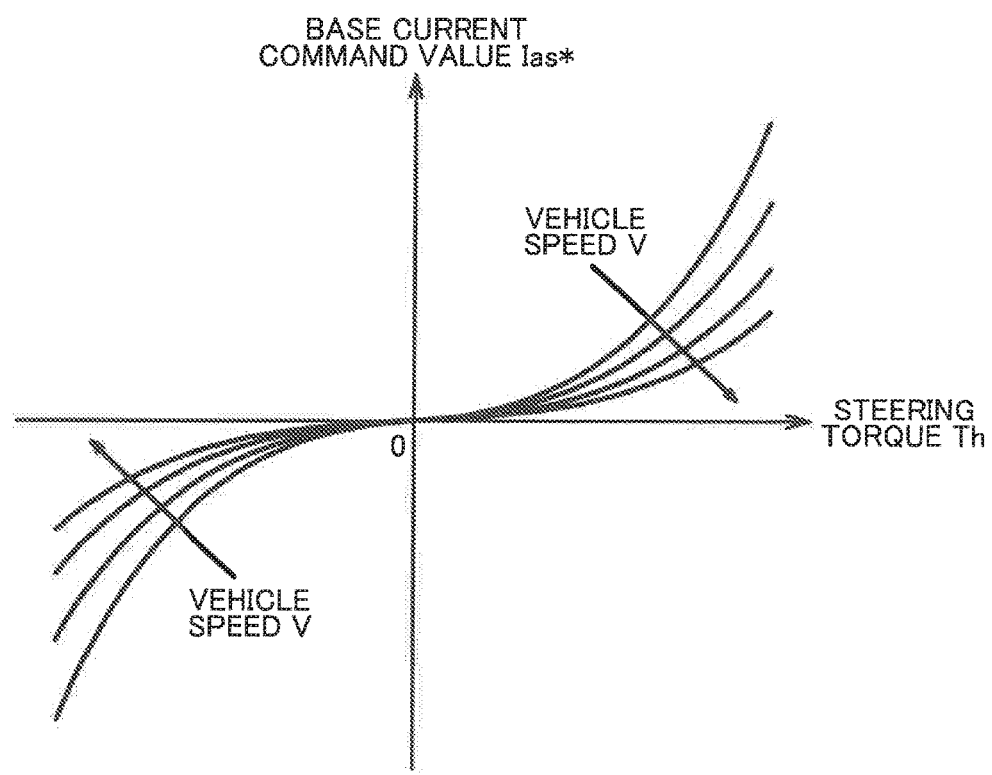
FIG. 3 is a map showing the relationship between steering torque and a base current command value, which is used when the control device of the first embodiment calculates a base current command value.

As shown in the graph of FIG. 3, the base current command value calculation circuit 55 has a map showing the relationship among the steering torque Th, the vehicle speed V, and the base current command value Ias*. As shown in this map, the base current command value calculation circuit 55 sets the base current command value Ias* so that the absolute value of the base current command value Ias* increases as the absolute value of the steering torque Th increases and as the vehicle speed V decreases.

As shown in FIG. 2, the first correction value calculation circuit 56 calculates a first correction value Ira* based on the steering angle θs detected by the steering angle sensor 6. The first correction value Ira* is a correction component that corrects the base current command value Ias* so that a steering reaction force is applied to the steering shaft 21. The steering reaction force is a force that resists operation of the steering wheel 20.

Figure 4:
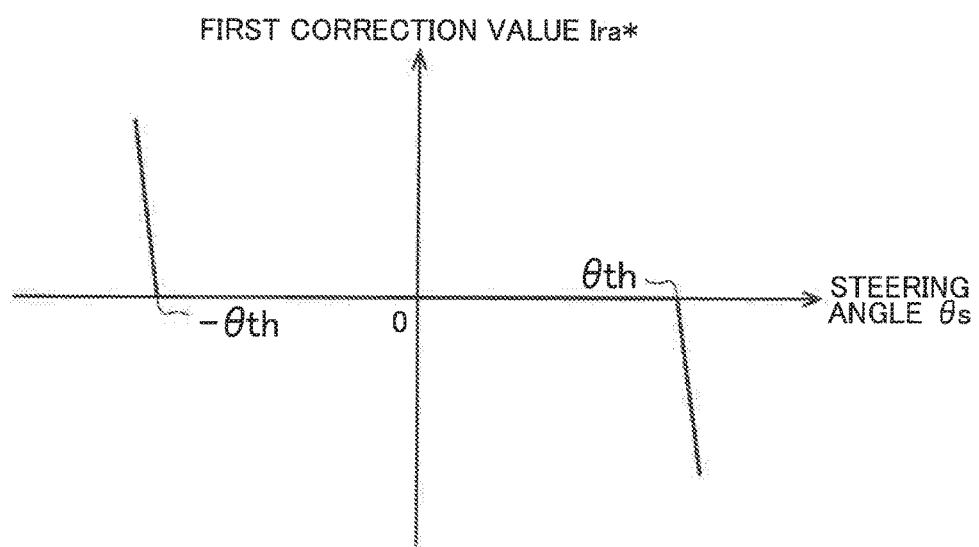
FIG. 4 is a map showing the relationship between a steering angle and a first correction value, which is used when the control device of the first embodiment calculates a first correction value.

As shown in the graph of FIG. 4, the first correction value calculation circuit 56 has a map showing the relationship between the steering angle θs and the first correction value Ira*. As shown in this map, the first correction value calculation circuit 56 sets a steering angle threshold θth for the steering angle θs. The steering angle threshold θth is set based on the steering angle θs immediately before reaching the desired steering angle value $θ_E$ that corresponds to the virtual steering limit position of the steering wheel 20. That is, the absolute value of the steering angle threshold θth is set to a value that is close to, and smaller than, the absolute value of the desired steering angle value $θ_E$.

The first correction value calculation circuit 56 sets the first correction value Ira* to zero when the absolute value of the steering angle θs is less than the steering angle threshold θth. When the absolute value of the steering angle θs becomes equal to or larger than the steering angle threshold θth, the first correction value calculation circuit 56 rapidly increases the first correction value Ira* with an increase in absolute value of the steering angle θs. The first correction value Ira* is set to a value of the opposite sign to that of the steering angle θs. That is, the first correction value Ira* is set so that, when the position of the steering wheel 20 becomes close to its steering limit position, the absolute value of the base current command value Ias* calculated by the base current command value calculation circuit 55 is reduced and the steering reaction force is applied to the steering shaft 21.

As shown in FIG. 2, the second correction value calculation circuit 57 calculates a second correction value Irb* based on the steering angle θs detected by the steering angle sensor 6 and the desired steering angle value $θ_E$ stored in the memory 59. The second correction value Irb* is a correction value that corrects the base current command value Ias* so that the steering angle θs becomes equal to the desired steering angle value Or when the position of the steering wheel 20 becomes close to the steering limit position. For example, the second correction value calculation circuit 57 performs proportional-integral-derivative (PID) control.

Figure 5:
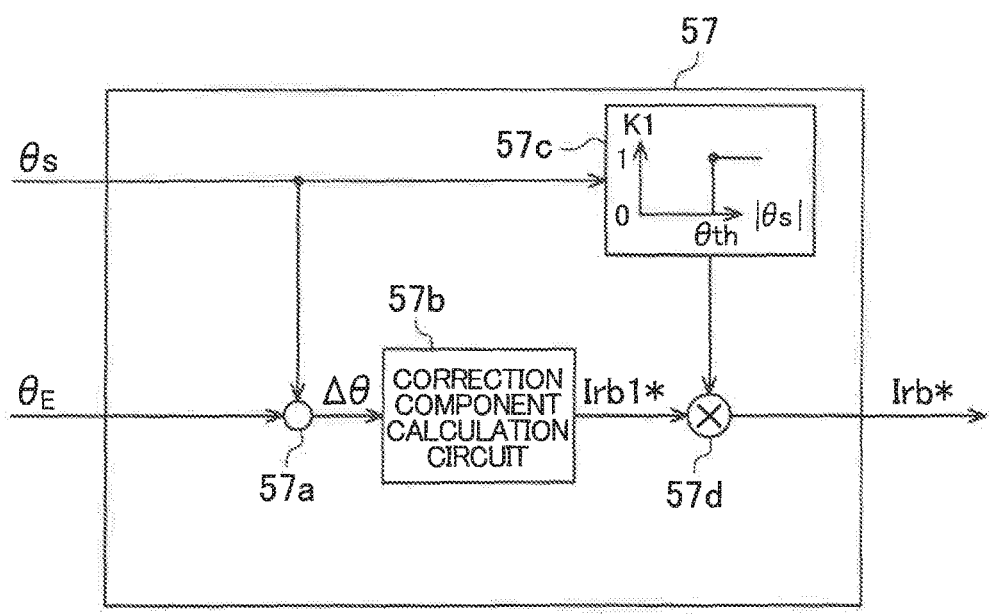
FIG. 5 is a functional block diagram of a second correction value calculation circuit of the first embodiment.

As shown in FIG. 5, the second correction value calculation circuit 57 has a subtractor 57a, a correction component calculation circuit 57b, a correction gain calculation circuit 57c, and a multiplier 57d. The subtractor 57a receives the steering angle θs and the desired steering angle value $θ_E$ and calculates a first deviation Δθ that is the difference between the steering angle θs and the desired steering angle value $θ_E$.

The correction component calculation circuit 57b receives the first deviation Δθ calculated by the subtractor 57a and calculates a tentative correction value Irb1*. The correction component calculation circuit 57b calculates the tentative correction value Irb1* so as to eliminate the first deviation Δθ, namely so as to make the steering angle θs closer to the desired steering angle value $θ_E$.

The correction gain calculation circuit 57c calculates correction gain K1 based on the steering angle θs. The correction gain calculation circuit 57c has a map showing the relationship between the steering angle θs and the correction gain K1. The correction gain calculation circuit 57c sets a steering angle threshold θth for the steering angle θs. This steering angle threshold θth is equal to the steering angle threshold θth that is set in the first correction value calculation circuit 56. The correction gain calculation circuit 57c sets the correction gain K1 to zero when the absolute value of the steering angle θs is less than the steering angle threshold θth. The correction gain calculation circuit 57c sets the correction gain K1 to one when the absolute value of the steering angle θs is larger than the steering angle threshold θth.

The multiplier 57d multiplies the tentative correction value Irb1* calculated by the correction component calculation circuit 57b and the correction gain K1 calculated by the correction gain calculation circuit 57c to calculate the second correction value Irb*.

The functional significance of setting the correction gain K1 will be described. For example, it is herein assumed that the second correction value calculation circuit 57 does not have the function to calculate the correction gain K1, and that the current position of the steering wheel 20 is not close to the steering limit position, that is, the steering angle θs detected by the steering angle sensor 6 is less than the steering angle threshold θth and the current position of the steering wheel 20 is far enough from the virtual steering limit position. In this case, the tentative correction value Irb1* calculated by the correction component calculation circuit 57b of the second correction value calculation circuit 57 is used as it is as the second correction value Irb* to correct the base current command value Ias*. Accordingly, the steering wheel 20 may be automatically turned to the desired steering angle value $θ_E$ even though the current position of the steering wheel 20 is still not close to the steering limit position. It is therefore preferable that the second correction value Irb* calculated by the second correction value calculation circuit 57 be used only when the current position of the steering wheel 20 is close to the steering limit position, namely only when the steering angle θs detected by the steering angle sensor 6 is equal to or larger than the steering angle threshold θth. Accordingly, it is preferable to set the correction gain K1 to zero when the steering angle θs is less than the steering angle threshold θth and to one when the steering angle θs is equal to or larger than the steering angle threshold θth.

As shown in FIG. 2, the addition circuit 58 calculates the q-axis current command value Iq* by adding the base current command value Ias* calculated by the base current command value calculation circuit 55, the first correction value Ira* calculated by the first correction value calculation circuit 56, and the second correction value Irb* calculated by the second correction value calculation circuit 57.

The control signal generation circuit 54 generates a control signal by performing current feedback control on the d-q coordinate system based on the d-axis current command value Id*, the q-axis current command value Iq*, the current value I of each phase, and the rotation angle θm. Specifically, the control signal generation circuit 54 calculates a d-axis current value and a q-axis current value, namely an actual current value of the motor 30 on the d-q coordinate system, by mapping the current value I of each phase to the d-q coordinates based on the rotation angle θm. The control signal generation circuit 54 generates a control signal by performing current feedback control so that the d-axis current value follows the d-axis current command value Id* and so that the q-axis current value follows the q-axis current command value Iq*. This control signal is output to the inverter circuit 50, whereby driving power according to the control signal is supplied to the motor 30. The motor 30 thus generates assist torque according to the q-axis current command value Iq*.

Functions and effects of the EPS 1 according to the present embodiment will be described.

(1) For example, when the driver operates the steering wheel 20 in the right steering direction and steering torque in the right steering direction, namely positive steering torque Th, is applied to the steering wheel 20, the control device 5 calculates a positive base current command value Ias* and a positive q-axis current command value Iq* according to the steering torque Th, as shown in FIG. 3. Positive assist torque according to the q-axis current command value Iq*, namely assist torque in the right steering direction, is thus applied from the motor 30 to the steering shaft 21, which assists the driver in operating the steering wheel 20.

When the steering angle θs reaches the steering angle threshold θth, the control device 5 rapidly increases the first correction value Ira* in the negative direction, as shown in FIG. 4. Accordingly, the q-axis current command value Iq* and the assist torque that is output from the motor 30 also decrease rapidly. With the rapid decrease in assist torque, the steering reaction force the driver feels through the steering wheel 20 increases rapidly, which makes it difficult for the driver to operate the steering wheel 20 in the right steering direction to a steering angle θs larger than the steering angle threshold θth. The steering wheel 20 feels heavy when the steering angle θs becomes close to the steering angle threshold value θth. This allows the driver to recognize that the steering wheel 20 has been operated to a position close to the virtual steering limit position. The expression "the steering wheel 20 feels heavy" herein means that it feels heavy when the driver attempts to further operate the steering wheel 20, which has been operated to the steering angle θs close to the steering angle threshold θth, to a steering angle θs larger than the steering angle threshold value θth.

However, the first correction value calculation circuit 56 calculates the first correction value Ira* determined by the steering angle θs by using the map. Accordingly, the steering wheel 20 may be operated to a position beyond the virtual steering limit position if the steering torque Th that is applied from the driver to the steering wheel 20 becomes too large.

In this respect, the second correction value calculation circuit 57 calculates the second correction value Irb* so that the current steering angle θs of the steering wheel 20 follows the desired steering angle value $θ_E$, namely a desired value of the steering angle θs at the virtual steering limit position, when the steering angle θs becomes equal to or larger than the steering angle threshold θth. That is, the second correction value calculation circuit 57 calculates the second correction value Irb* so that the steering angle θs becomes equal to the desired steering angle value $θ_E$ when the steering wheel 20 is operated to a position beyond the virtual steering limit position. Since the base current command value Ias* is corrected with the second correction value Irb*, the driver can be restrained from turning the steering wheel 20 to a position beyond the virtual steering limit position. Similar functions are carried out when the steering wheel 20 is operated in the left steering direction.

A second embodiment of the steering device will be described. The steering device of the present embodiment basically has a configuration similar to that of the first embodiment shown in FIGS. 1 to 5. However, the second embodiment is different from the first embodiment in the method for setting the steering angle threshold θth and the configuration of the second correction value calculation circuit 57. The configurations similar to those of the first embodiment are denoted with the same reference characters as those of the first embodiment, and description thereof will be omitted.

Figure 6:
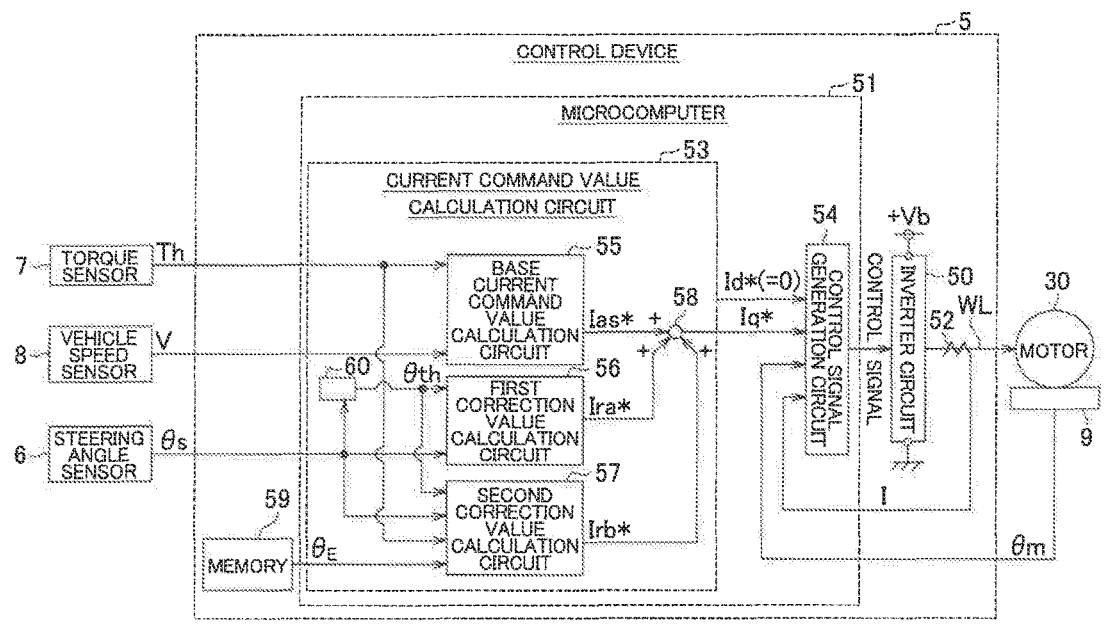
FIG. 6 is a functional block diagram of a control device for a steering device of a second embodiment.

As shown in FIG. 6, the current command value calculation circuit 53 has a threshold calculation circuit 60. The threshold calculation circuit 60 sets the steering angle threshold θth according to the steering angle θs. The first correction value calculation circuit 56 calculates the first correction value Ira* based on the steering angle threshold θth and the steering angle θs.

Figure 7:
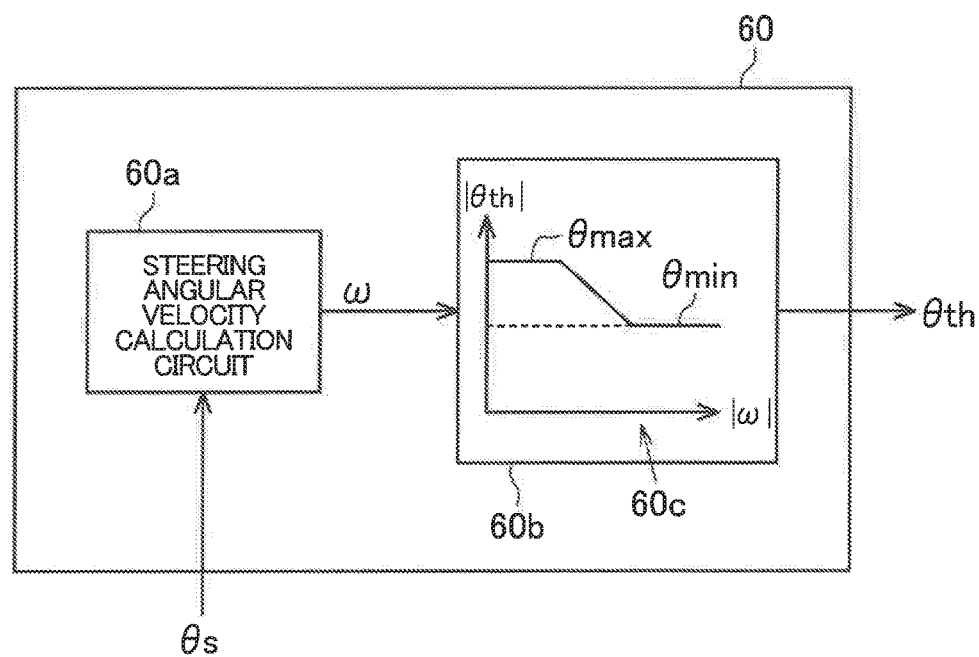
FIG. 7 is a functional block diagram of a threshold calculation circuit of the second embodiment.

As shown in FIG. 7, the threshold calculation circuit 60 has a steering angular velocity calculation circuit 60a and a variable threshold setting circuit 60b. The steering angular velocity calculation circuit 60a calculates a steering angular velocity ω based on the steering angle θs. The steering angular velocity ω is a steering angle velocity of the steering wheel 20 per unit time. The variable threshold setting circuit 60b calculates the steering angle threshold θth based on the steering angular velocity ω calculated by the steering angular velocity calculation circuit 60a. The variable threshold setting circuit 60b has a map 60c showing the relationship between the steering angular velocity ω and the steering angle threshold θth. As shown in this map 60c, the steering angle threshold θth is set between an upper limit θmax and a lower limit θmin. The variable threshold setting circuit 60b sets the steering angle threshold θth to the upper limit θmax when the steering angular velocity ω is in a certain range including zero. The variable threshold setting circuit 60b sets the steering angle threshold θth so that the absolute value of the steering angle threshold θth decreases as the absolute value of the steering angular velocity ω increases. The variable threshold setting circuit 60b sets the steering angle threshold θth to the lower limit θmin when the steering angular velocity ω becomes equal to or higher than a predetermined value.

The upper limit θmax is set so that the steering angle θs of the steering wheel 20 does not become larger than the desired steering angle value $θ_E$ when the steering wheel 20 that has been operated to a position close to the virtual steering limit position is turned toward the desired steering angle value $\theta_E$ at a predetermined steering angular velocity ω. The reason why the upper limit θmax is set in this manner is as follows. The steering angle threshold θth is set based on the steering angle θs immediately before reaching the desired steering angle value $\theta_E$. If the steering angle threshold θth is set to a value closer to the desired steering angle value $\theta_E$, a sufficient steering reaction force may not be applied to the steering wheel 20 by the first correction value Ira* calculated by the first correction value calculation circuit 56, and the steering angle θs of the steering wheel 20 may become larger than the desired steering angle value $\theta_E$ at the predetermined steering angular velocity ω.

The lower limit θmin is set so that the first correction value calculation circuit 56 does not calculate the first correction value Ira* too early. The reason why the lower limit θmin is set in this manner is as follows. If the steering angle threshold θth is set so as to decrease as the steering angular velocity c of the steering wheel 20 increases, the steering reaction force may be applied to the steering wheel 20 by the first correction value Ira* when the position of the steering wheel 20 is close to a neutral steering position. In the second embodiment, the steering angle threshold θth is merely changed, and the first correction value Ira* is changed at the same rate with respect to a change in steering angle θs as in the first embodiment shown in the graph of FIG. 4.

Figure 8:
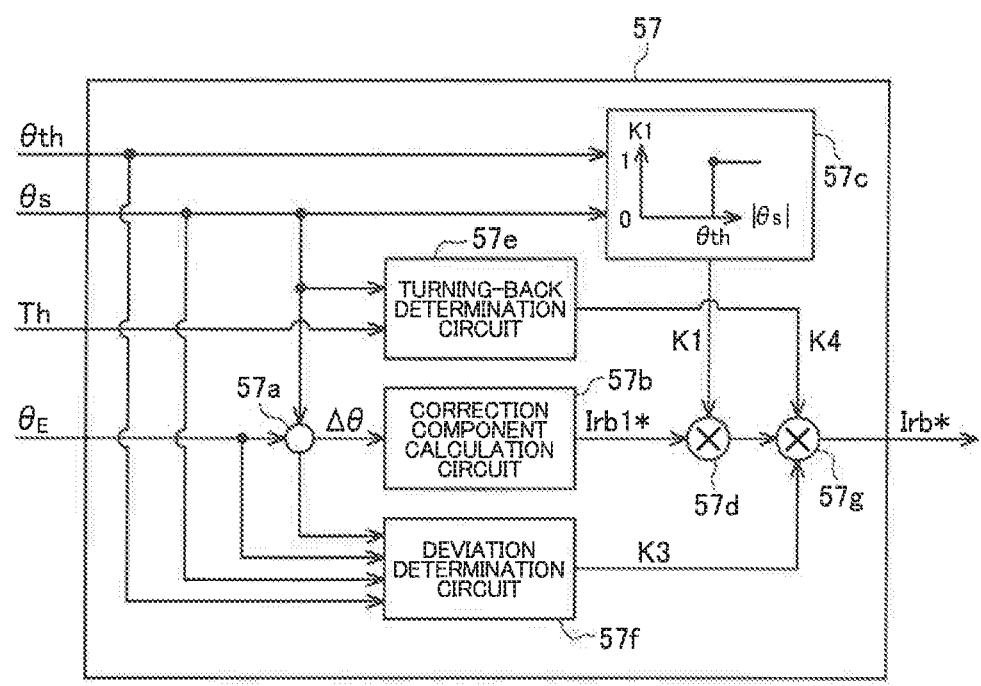
FIG. 8 is a functional block diagram of a second correction value calculation circuit of the second embodiment.

As shown in FIG. 8, the second correction value calculation circuit 57 calculates the second correction value Irb* based on the steering angle threshold θth, the steering angle θs, the steering torque Th, and the desired steering angle value $\theta_E$. The second correction value calculation circuit 57 of the second embodiment further includes a turning-back determination circuit 57e, a deviation determination circuit 57f, and a multiplier 57g. The correction gain calculation circuit 57c of the second correction value calculation circuit 57 calculates the correction gain K1 based on the steering angle threshold θth calculated by the threshold calculation circuit 60 and the steering angle θs.

The turning-back determination circuit 57e determines, based on the steering angle θs and the steering torque Th, if the driver is operating the steering wheel 20 from a position closer to the steering limit position toward the neutral steering position (hereinafter this operation is referred to as "turning back"), and calculates correction gain K4 as the determination result.

The deviation determination circuit 57f has stored therein the upper limit θmax and the lower limit θmin of the steering angle threshold θth and the absolute value of a second deviation Δθ2 that is the difference between the desired steering angle value $\theta_E$ and the lower limit θmin. The deviation determination circuit 57f determines, based on the first deviation Δθ, the desired steering angle value $\theta_E$, the steering angle θs, the steering angle threshold θth, the upper limit θmax, the lower limit θmin, and the second deviation Δθ2, if the tentative correction value Irb1* calculated by the correction component calculation circuit 57b may be used as the second correction value Irb*, and calculates correction gain K3 as the determination result.

The multiplier 57g multiplies the result of multiplication of the tentative correction value Irb1* and the correction gain K1 in the multiplier 57d by the correction gain K3 and the correction gain K4 to calculate the second correction value Irb*.

How the turning-back determination circuit 57e determines if the steering wheel 20 is being turned back will be described. The turning-back determination circuit 57e monitors a change in steering angle θs that is periodically detected by the steering angle sensor 6 and a change in steering torque Th that is periodically detected by the torque sensor 7. Specifically, the turning-back determination circuit 57e monitors if the absolute value of the steering angle θs detected in the most recent period and the absolute value of the steering torque Th detected in the most recent period are larger than the absolute value of the steering angle θs detected in the previous period and the absolute value of the steering torque Th detected in the previous period (hereinafter referred to as "a change in steering angle θs and a change in steering torque Th are positive") or are smaller than the absolute value of the steering angle θs detected in the previous period and the absolute value of the steering torque Th detected in the previous period (hereinafter referred to as "a change in steering angle θs and a change in steering torque Th are negative"). The previous period means a period immediately before the most recent period.

For example, in the case where both of a change in steering angle θs and a change in steering torque Th are positive, the steering wheel 20 is being rotated from a position closer to the neutral steering position toward the steering limit position. In the case where both of a change in steering angle θs and a change in steering torque Th are negative, the steering wheel 20 is being rotated from a position closer to the steering limit position toward the neutral steering position.

If both of a change in steering angle θs and a change in steering torque Th are negative, the turning-back determination circuit 57e determines that the steering wheel 20 is being turned back.

The reason why the turning-back determination circuit 57e determines that the steering wheel 20 is being turned back if both of a change in steering angle θs and a change in steering torque Th are negative is that, if based only on the steering angle θs or the steering torque Th, the turning-back determination circuit 57e may not be able to accurately determine if the steering wheel 20 is being turned back. For example, it is herein assumed that the turning-back determination circuit 57e determines if the steering wheel 20 is being turned back or not based only on the steering angle θs. In this case, depending on the road surface condition, slight vibration may be transmitted from the steered wheels 4 to the steering wheel 20 through the rack shaft 23 or the steering shaft 21. Such slight vibration may cause the steering wheel 20 to repeatedly rotate slightly in the right-left direction. The turning-back determination circuit 57e therefore may determine that the steering wheel 20 is being turned back, even though the driver is not turning back the steering wheel 20. Accordingly, the turning-back determination circuit 57e determines that the steering wheel 20 is being turned back if both of a change in steering angle θs and a change in steering torque Th are negative.

Figure 9:
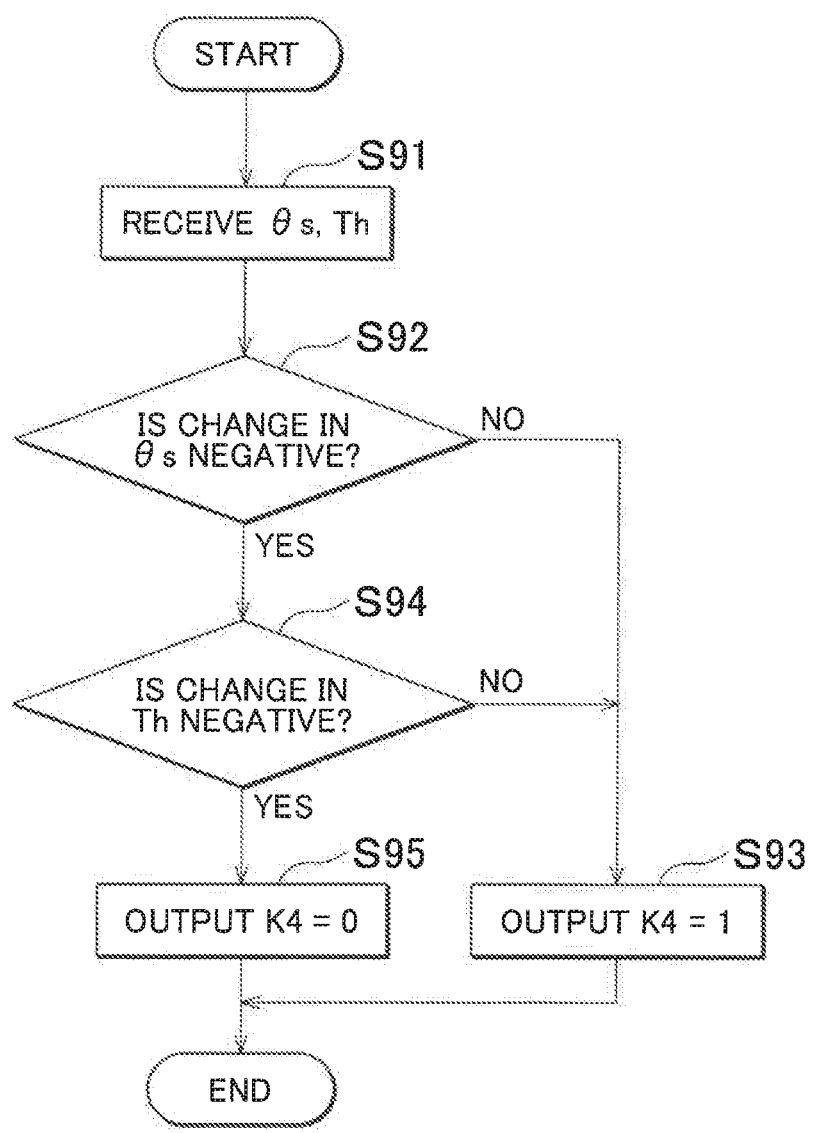
FIG. 9 is a flowchart showing the control flow of a turning-back determination circuit of the second embodiment.

The control flow of the turning-back determination circuit 57e will be described. As shown in FIG. 9, the turning-back determination circuit 57e receives the steering angle θs and the steering torque Th (step S91). The turning-back determination circuit 57e determines if a change in steering angle θs is negative (step S92). If a change in steering angle θs is positive, the turning-back determination circuit 57e sets the correction gain K4 to one (step S93). If a change in steering angle θs is negative, the turning-back determination circuit 57e determines in the following step if a change in steering torque Th is negative (step S94). If a change in steering torque Th is not negative, the turning-back determination circuit 57e sets the correction gain K4 to one (step S93). If a change in steering torque Th is negative, the turning-back determination circuit 57e sets the correction gain K4 to zero (step S95). The correction gain K4 being set to zero means that the turning-back determination circuit 57e has determined that the steering wheel 20 is being turned back.

Figure 10:
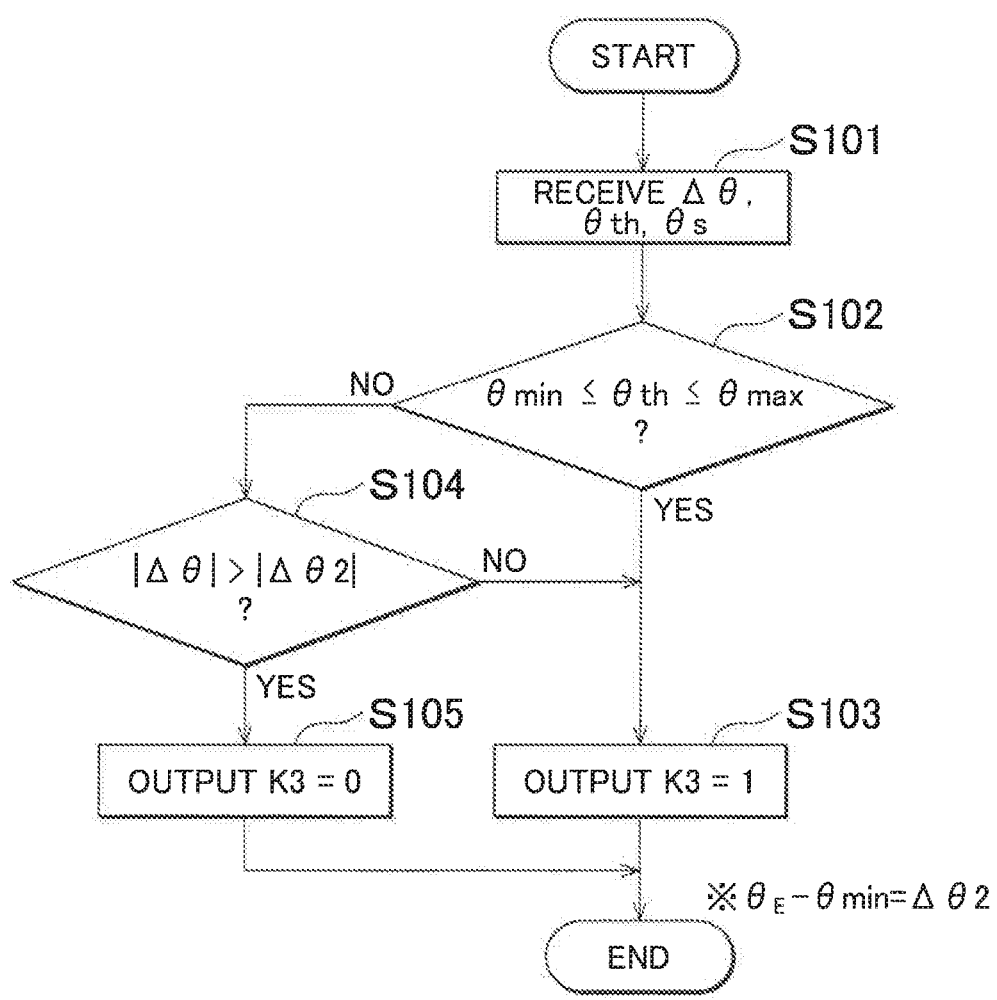
FIG. 10 is a flowchart showing the control flow of a deviation determination circuit of the second embodiment.

The control flow of the deviation determination circuit 57f will be described. As shown in FIG. 10, the deviation determination circuit 57f receives the first deviation $\Delta\theta$, the steering angle threshold 9th, and the steering angle $\theta$s (step S101). The deviation determination circuit 57f determines if the steering angle threshold $\theta$th is a value equal to or larger than the lower limit $\theta$min and equal to or smaller than the upper limit $\theta$max (step S102). If it is determined that the steering angle threshold $\theta$th is a value equal to or larger than the lower limit $\theta$min and equal to or smaller than the upper limit $\theta$max, the deviation determination circuit 57f sets the correction gain K3 to one in the following step (step S103). If it is determined in step S102 that the steering angle threshold $\theta$th is not a value equal to or larger than the lower limit $\theta$min and equal to or smaller than the upper limit $\theta$max, the deviation determination circuit 57f determines in the following step if the absolute value of the first deviation $\Delta\theta$ calculated by the subtractor 57a is larger than the absolute value of the second deviation $\Delta\theta 2$ that is a predetermined value stored in the deviation determination circuit 57f (step S104). If it is determined that the absolute value of the first deviation $\Delta\theta$ is larger than the absolute value of the second deviation $\Delta\theta 2$, the deviation determination circuit 57f sets the correction gain K3 to zero (step S105). If it is determined that the absolute value of the first deviation $\Delta\theta$ is not larger than the absolute value of the second deviation $\Delta\theta 2$, the deviation determination circuit 57f sets the correction gain K3 to one (step S103). The absolute value of the first deviation $\Delta\theta$ being larger than the absolute value of the second deviation $\Delta\theta 2$ means that the steering angle $\theta$s is smaller than the lower limit $\theta$min of the steering angle threshold $\theta$th.

The functional significance of setting the correction gain K3 and the correction gain K4 will be described. For example, it is herein assumed that the second correction value calculation circuit 57 does not have the turning-back determination circuit 57e and the deviation determination circuit 57f, and that the current position of the steering wheel 20 is close to the steering limit position, that is, the steering angle $\theta$s detected by the steering angle sensor 6 is equal to or larger than the steering angle threshold $\theta$th and is close to the desired steering angle value $\theta_E$. When the driver is turning back the steering wheel 20 from a position close to the steering limit position toward the neutral steering position, the tentative correction value Irb1* calculated by the correction component calculation circuit 57b of the second correction value calculation circuit 57 is used as it is as the second correction value Irb* to correct the base current command value Ias*. Accordingly, the steering wheel 20 may be automatically turned to the desired steering angle value $\theta_E$ even though the driver is attempting to turn back the steering wheel 20 from a position close to the steering limit position toward the neutral steering position. It is therefore preferable that the second correction value Irb* calculated by the second correction value calculation circuit 57 be zero when the steering wheel 20 is being turned back. Accordingly, it is preferable to set the correction gain K4 to zero when the steering wheel 20 is being turned back and to one when the steering wheel 20 is being operated toward the steering limit position.

There may be a case where the steering angle threshold $\theta$th is not a value equal to or larger than the lower limit $\theta$min and equal to or smaller than the upper limit $\theta$max due to some sort of error in calculation of the variable threshold setting circuit 60b. For example, it is herein assumed that the steering angle threshold $\theta$th is smaller than the lower limit $\theta$min and the steering angle $\theta$s of the steering wheel 20 is larger than the steering angle threshold $\theta$th and smaller than the lower limit $\theta$min. In this case, the correction gain calculation circuit 57c may set the correction gain K1 to one. That is, even though the current position of the steering wheel 20 is not close to the steering limit position, namely even though the steering angle $\theta$s is smaller than the lower limit $\theta$min of the steering angle threshold $\theta$th, the tentative correction value Irb1* calculated by the correction component calculation circuit 57b of the second correction value calculation circuit 57 may be used as it is as the second correction value Irb* to correct the base current command value Ias*. Accordingly, the steering wheel 20 may be automatically turned to the desired steering angle value $\theta_E$ even though the current position of the steering wheel 20 is not close to the steering limit position. It is therefore preferable that the second correction value Irb* calculated by the second correction value calculation circuit 57 be zero when the steering angle threshold $\theta$th calculated by the threshold calculation circuit 60 is not a value equal to or larger than the lower limit $\theta$min and equal to or smaller than the upper limit $\theta$max and the steering angle $\theta$s is smaller than the lower limit $\theta$min. Accordingly, in the case where the steering angle threshold $\theta$th is not a value equal to or larger than the lower limit $\theta$min and equal to or smaller than the upper limit $\theta$max, it is preferable to set the correction gain K3 to zero when the absolute value of the first deviation $\Delta\theta$ is larger than the absolute value of the second deviation $\Delta\theta 2$ and to one when the absolute value of the first deviation $\Delta\theta$ is not larger than the absolute value of the second deviation $\Delta\theta 2$.

The present embodiment has the following effects in addition to those of the first embodiment.

(2) The variable threshold setting circuit 60b of the threshold calculation circuit 60 changes the steering angle threshold $\theta$th according to the steering angular velocity $\omega$ of the steering wheel 20. Specifically, the steering angle threshold $\theta$th is set between the upper limit $\theta$max and the lower limit $\theta$min so as to decrease as the steering angular velocity c of the steering wheel 20 increases. Accordingly, the higher the steering angular velocity a of the steering wheel 20 is, the earlier the first correction value calculation circuit 56 calculates the first correction value Ira*. The steering wheel 20 can thus be restrained from being operated to a position beyond the virtual steering limit position even if the steering angular velocity $\omega$ of the steering wheel 20 increases rapidly.

(3) The turning-back determination circuit 57e sets the correction gain K4 to zero if it is determined that the steering wheel 20 is being turned back. Since the multiplier 57g multiplies the output of the multiplier 57d by the correction gain K4, the second correction value Irb* is zero. Accordingly, the driver's operation of turning back the steering wheel 20 is not hindered.

(4) In the case where the steering angle threshold $\theta$th is not a value equal to or larger than the lower limit $\theta$min and equal to or smaller than the upper limit $\theta$max, the deviation determination circuit 57f sets the correction gain K3 to zero if it is determined that the absolute value of the first deviation $\Delta\theta$ that is the difference between the desired steering angle value $\theta_E$ and the steering angle $\theta$s is larger than the absolute value of the second deviation $\Delta\theta 2$ that is the difference between the desired steering angle value $\theta_E$ and the lower limit $\theta$min. Since the multiplier 57g multiplies the tentative correction value Irb1* by the correction gain K3, the second correction value Irb* is zero. The steering wheel 20 can thus be restrained from being rapidly operated from a position that is not close to the steering limit position to the virtual steering limit position.

The above embodiments may be modified as follows unless technical inconsistency arises. In the first and second embodiments, the correction gain calculation circuit 57c of the second correction value calculation circuit 57 uses the steering angle threshold θth. However, the present invention is not limited to this. For example, the correction gain calculation circuit 57c may use a threshold of the steering angle θs which is slightly larger than the steering angle threshold θth. In the first and second embodiments, the motor 30 is controlled to generate a steering reaction force when the steering torque Th that is applied from the driver to the steering wheel 20 becomes too large. That is, it is when the steering angle θs becomes equal to or larger than the steering angle threshold θth that the steering torque Th that is applied from the driver to the steering wheel 20 becomes so large that the steering wheel 20 is operated to a position beyond the virtual steering limit position. In other words, the second correction value Irb* calculated by the second correction value calculation circuit 57 may correct the base current command value Ias* slightly after the steering angle θs reaches the steering angle threshold θth.

In the first and second embodiments, the desired steering angle value $\theta_E$ is set to a value close to, and smaller than, the upper limit of the steering angle θs which corresponds to the maximum extent to which the steering wheel 20 and the steered wheels 4 can be mechanically operated. However, the present invention is not limited to this. For example, the desired steering angle value $\theta_E$ may be set to a value smaller enough than the upper limit of the steering angle θs which corresponds to the maximum extent to which the steering wheel 20 and the steered wheels 4 can be mechanically operated.

It is herein assumed that the steering devices of the first and second embodiments are applied to variable gear ratio systems (VGR systems). The VGR systems variably sets the ratio between the steering angle θs of the steering wheel 20 and the steered angle of the steered wheels 4. Since this ratio is determined according to the steering angle θs, there may be a case where the steering wheel 20 has not reached the virtual steering limit position although the steered wheels 4 have been steered to their limit positions and cannot be steered anymore. In this case, the steered wheels 4 will not be steered anymore even if the steering wheel 20 is further operated to the virtual limit position, which may give the driver a strange steering feel. Such a strange steering feel can be eliminated by setting the desired steering angle value $\theta_E$ to a value smaller enough than the upper limit of the steering angle θs which corresponds to the maximum extent to which the steering wheel 20 and the steered wheels 4 can be mechanically operated. In this case, the desired steering angle value $\theta_E$ may be a variable rather than a constant. In the case where the desired steering angle value $\theta_E$ is a variable, the position at which operation of the steering wheel 20 is stopped can be appropriately varied according to the steering angle θs of the steering wheel 20.

In the first and second embodiments, the steering device is applied to electric power steering systems. However, the steering device of the present invention may be applied to steer-by-wire systems. In the steer-by-wire systems, the steering wheel 20 is not mechanically connected to the steered wheels 4. Accordingly, in order to give a responsive feel when the driver operates the steering wheel 20, a steering reaction force according to the absolute value of the steering angle θs is applied to the steering wheel 20. In the above examples, the control device 5 calculates in the base current command value calculation circuit 55 the base current command value Ias* corresponding to assist torque and calculates in the first correction value calculation circuit 56 the first correction value Ira* so that the assist torque that is output from the motor 30 decreases rapidly, whereby the control device 5 controls the motor 30 to generate a steering reaction force. In the case where the steering device is applied to the steer-by-wire systems and the motor 30 is used as a reaction force motor, however, the control device 5 calculates in the base current command value calculation circuit 55 a base current command value corresponding to a base steering reaction force and calculates in the first correction value calculation circuit 56 a first correction value Ira* that represents an increase in base steering reaction force applied to the steering shaft 21. It is therefore preferable that the first correction value Ira* have the same sign as the steering angle θs in the graph of FIG. 4.

With such a configuration, the virtual steering limit position is also set by rapidly increasing a steering reaction force as in the above examples. In the above embodiments, the output of the motor 30 is reduced when the position of the steering wheel 20 becomes close to the virtual steering limit position. This gives the driver a heavy steering feel through the steering wheel 20 and thus makes the driver recognize that the steering wheel 20 has been operated to a position close to the virtual steering limit position. In the case where the steering device is applied to steer-by-wire systems, however, the output of the reaction force motor is increased when the position of the steering wheel 20 becomes close to the virtual steering limit position. This gives the driver a heavy steering feel through the steering wheel 20 and thus makes the driver recognize that the steering wheel 20 has been operated to a position close to the virtual steering limit position.

In the first and second embodiments, the steering angle sensor 6 detects the steering angle θs. However, the present invention is not limited to this. For example, the control device 5 may calculate the steering angle θs from the rotation angle θm detected by the rotation angle sensor 9. In this case, the steering angle sensor 6 may be omitted.

In the second embodiment, the turning-back determination circuit 57e is provided in the second correction value calculation circuit 57. However, the turning-back determination circuit 57e may be provided in any part of the control device 5. In the second embodiment, the tentative correction value Irb1* is multiplied by the correction gain K4 calculated by the turning-back determination circuit 57e. However, the second correction value Irb* may be multiplied by the correction gain K4. The turning-back determination circuit 57e may be omitted.

In the second embodiment, the deviation determination circuit 57f is provided in the second correction value calculation circuit 57. However, the deviation determination circuit 57f may be provided in any part of the control device 5. In the second embodiment, the tentative correction value Irb1* is multiplied by the correction gain K3 calculated by the deviation determination circuit 57f. However, the second correction value Irb* may be multiplied by the correction gain K3. The deviation determination circuit 57f may be omitted.

In the second embodiment, the variable threshold setting circuit 60b is provided in the current command value calculation circuit 53. However, the variable threshold setting circuit 60*b* may be provided in any part of the control device 5. The variable threshold setting circuit 60*b* may be omitted.

In the first embodiment, the steering angle threshold θth is set in the map in the correction gain calculation circuit 57*c* which shows the relationship between the steering angle θs and the correction gain K1. However, the present invention is not limited to this. For example, the steering angle threshold θth may be stored in the memory 59 and may be output from the memory 59 to the correction gain calculation circuit 57*c*. In rare cases, however, the steering angle threshold θth output from the memory 59 to the correction gain calculation circuit 57*c* may be too small for some reason. In this case, it is preferable to provide the deviation determination circuit 57*f* of the second embodiment in the second correction value calculation circuit 57. In the case where the deviation determination circuit 57*f* is used in the first embodiment, the absolute value of the second deviation Δθ2 stored in the deviation determination circuit 57*f* is the difference between the desired steering angle value $\theta_E$ and the normal steering angle threshold θth that is supposed to be output from the memory 59.

The invention claimed is:

1. A steering device for use in a vehicle, the steering device comprising:
    a motor configured to generate a steering reaction torque that is applied to a steering mechanism of the vehicle;
    a sensor configured to detect a state quantity corresponding to an operation state of a steering wheel by a user; and
    a microcomputer or circuit configured to control driving of the motor based on a command value calculated according to the detected operation state, the microcomputer or circuit being configured to:
        calculate a base command value based on the detected state quantity, the base command value being a basic control component that regulates the steering reaction torque generated by the motor,
        when a steering angle value of the steering wheel reaches a threshold that is smaller than a virtual steering limit position, calculate a first correction value that increases the steering reaction torque generated by the motor by an assist torque amount,
        when the detected state quantity exceeds the steering reaction torque that includes the assist torque amount, calculate a second correction value being a control component that increases the steering reaction torque so that the steering angle value becomes equal to the virtual steering limit position,
        calculate the command value by adding the base command value, the first correction value, and the second correction value, and
        control the driving of the motor based on the calculated command value.

2. The steering device according to claim 1, wherein, the virtual steering limit position is set to a value smaller than a mechanical steering limit position of at least one of the steering wheel and a steered wheel, and the threshold is set to a value smaller than the desired steering angle value.

3. The steering device according to claim 1, wherein, the microcomputer or circuit is configured to decrease the threshold as a steering angular velocity of the steering wheel increases.

4. The steering device according to claim 1, wherein, the microcomputer or circuit is configured to determine whether the steering wheel is being turned back based on: (i) a change in the steering angle value of the steering wheel and (ii) a change in steering torque that is the state quantity, and
if the microcomputer or circuit determines that the steering wheel is being turned back, the second correction value is set to zero.

5. The steering device according to claim 1, wherein, the microcomputer or circuit is configured to determine whether a deviation condition is present based on:
    (i) the steering angle value is equal to or larger than the threshold, and
    (ii) a difference between the virtual steering limit position and the steering angle value is larger than a predetermined value, and
if the microcomputer or circuit determines that the deviation condition is present, the second correction value is set to zero.

6. An electric power steering system, comprising:
the steering device according to claim 1; and
a steering shaft serving as a shaft that mechanically transmits a rotary motion of the steering wheel to the steered wheel, wherein,
the state quantity includes the steering torque that is applied to the steering wheel.

7. The steering device according to claim 1, wherein the base command value is calculated based a map defining a pre-determined steering torque to a speed of the vehicle.

\* \* \* \* \*